Nov. 16, 1926.

C. M. LAFFOON 1,607,286

HIGH FREQUENCY GENERATOR

Filed June 26, 1923

WITNESSES:

INVENTOR
Carthrae M. Laffoon
BY
ATTORNEY

UNITED STATES PATENT OFFICE.

CARTHRAE M. LAFFOON, OF IRWIN, PENNSYLVANIA, ASSIGNOR TO WESTINGHOUSE ELECTRIC & MANUFACTURING COMPANY, A CORPORATION OF PENNSYLVANIA.

HIGH-FREQUENCY GENERATOR.

Application filed June 26, 1923. Serial No. 647,842.

My invention relates to high-frequency generators and it has particular relation to generators of the inductor type.

One object of my invention is to provide an improved generator of the above character, which is adapted to generate voltages of desired wave shape and which is very efficient in the elimination of losses caused by the pulsating flux induced by the high frequency armature current.

A second object of my invention is to provide an improved alternator in which the troubles caused by bearing currents that are characteristic of alternators of the inductor type are eliminated.

In carrying out my invention, I provide, instead of the usual inductor consisting of a disc-shaped body of magnetic material having polar projections cooperating with the stator core, an inductor whose main body is made of nonmagnetic, electrically conducting material of high tensile strength, a plurality of members of magnetic material being embedded within such body to provide the poles of the inductor.

My invention will be best understood by reference to the accompanying drawing, wherein—

Figure 1:
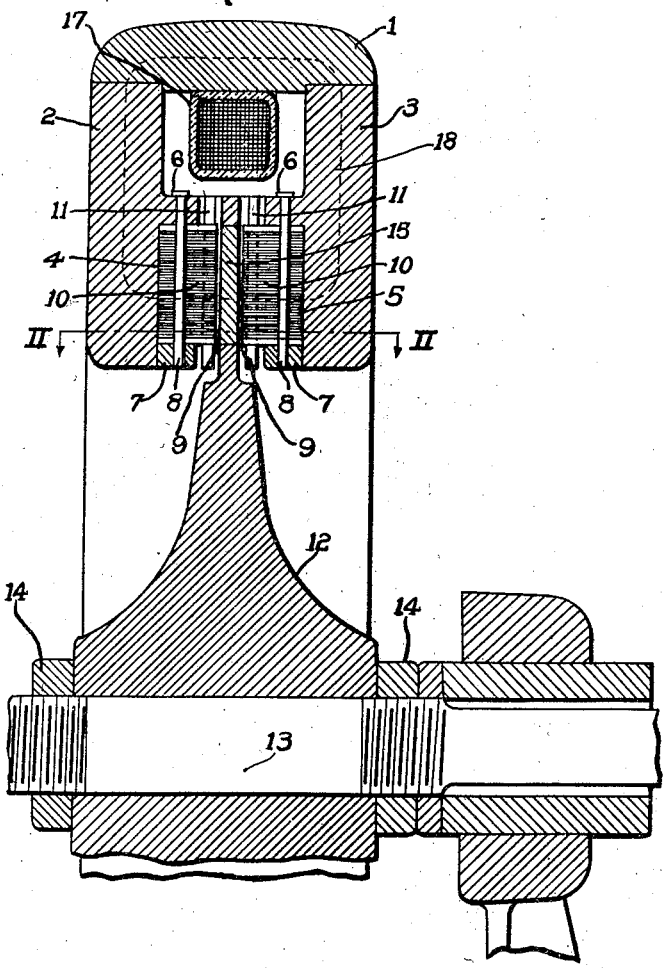
Figure 2:
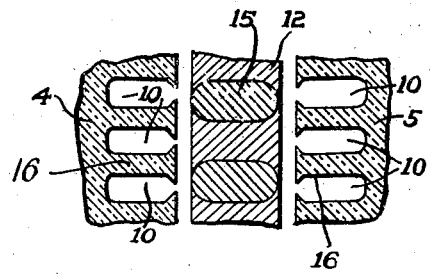

Figure 1 is a vertical sectional view of a part of an alternator embodying my invention, and Fig. 2 is an enlarged sectional view on the line II—II of Fig. 1, illustrating the stator slots and the pole members of the inductor.

Referring to Fig. 1, an annular stator frame 1 of magnetic material carries two members 2 and 3 of ring shape, to which are secured annular cores 4 and 5 of laminated magnetic material. Each of the cores 4 and 5 is secured between a flange 6 and a ring 7 by means of bolts 8. The laminated cores have opposite faces 9 lying in adjacent radial planes and provided with radially disposed slots 10 carrying an alternating-current winding 11. Between the adjacent faces of the laminated cores extends the outer portion of the inductor, which comprises a disc-shaped body 12 of non-magnetic material mounted securely upon a shaft 13, as by means of nuts 14. The non-magnetic inductor 12 has magnetic pole members 15 of proper shape embedded or otherwise secured radially therein to co-operate with the teeth 16 between the slots 10 of the laminated cores 4 and 5.

A preferred method of making the inductor consists in assembling the pole members in proper position in a jig and casting therearound a body of non-magnetic, electrically conducting material of high tensile strength, such as phosphor bronze, to form one integral disc-shape body which may be subsequently worked to its final shape indicated in the drawing. The method just described provides a mechanically strong construction which is, in electrical respects, superior to the structures used at present, as will be explained hereinafter.

In machines having inductors of solid magnetic material, the polar projections co-operating with the slotted stator cores are obtained by slotting the circumference of the inductor. The slots are thereafter filled with non-magnetic members in order to obtain a smooth surface and to decrease the windage. In some machines the non-magnetic fillers are made of electrically conducting material and arranged to give a closed electrical circuit around each pole.

It is, however, exceedingly difficult to obtain a mechanically satisfactory construction without affecting the shape of the poles. The latter is of primary importance in high frequency generators, and Fig. 2 shows the shape of the magnetic pole members 15 as used in the inductor 12 made according to my invention, the pole members being rounded or beveled at their ends adjacent to the cores 4 and 5. It would be exceedingly difficult to provide a construction employing poles of the shape just described in rotors of solid magnetic material as the slots between the polar projections of the rotor have to be so shaped as to retain the non-magnetic fillers in place.

With the inductor constructed in accordance with my invention, an ideal solution of the above mentioned problems is obtained; the magnetic poles may be shaped according to the most minute requirements as to the wave shape; the rotating surface is smooth and gives low windage losses; and the slotted conducting body gives a perfect damping winding around the poles and embodies, at the same time, a mechanically perfect construction.

In this connection, I will point out the importance of a good damper winding in high-frequency alternators of the inductor type. The principle of operation of such alternators is well known. A flux of constant strength is produced by an exciting winding 17 and traverses the stator cores, entering the magnetic pole members 15 on one side and leaving the same on the other, as indicated by the arrow 18 in Fig. 1. The total flux is constant; it is the pulsation of the fluxes interlinked with the respective winding conductors in the stator slots that produces the high-frequency voltage in said windings. The wave shape of the voltage depends upon the rate of change of the magnetic flux across the gap between the opposite teeth of the stator core, and this is determined by the shape of the magnetic poles in the inductor. Only the parts of the magnetic circuit which carry the windings and which are subjected to the pulsations of the flux are of laminated material.

It is of importance to restrict the pulsations of the flux to the laminated portions of the magnetic path and to eliminate the pulsations from these parts of the magnetic circuit which are made of solid magnetic material, such as the inductor pole members.

One source of flux pulsation in the inductor pole members is the effect of the teeth and slots of the stator. Another source is the reaction of the single-phase currents in the armature conductors in the stator. The pulsations due to the first source are to a certain extent reduced by making the slot openings as narrow as possible, that is by slots of the overhung type. The pulsations due to the armature reaction cannot be eliminated, except by providing the rotor with a damper winding which encloses the pole members and opposes any change of flux therein. Accordingly, a good damper winding is essential for the reduction of the losses and for good performance of the generator, and it is obvious that the solid body of highly conductive electrical material which surrounds the magnetic pole members in the indicator made according to my invention, provides a damper winding which is not equaled by any other construction.

There is a further advantage connected with an alternator embodying my invention. Inductors of solid magnetic material produce an excessive stray field. The stray field penetrates the bearing and induces, in the rotating shaft, an electromotive force which causes the bearing and the solid frame of the alternator to be traversed by currents which are a source of constant trouble. By the use of an inductor of non-magnetic material, a considerable reduction of the stray field is effected and the bearing current is almost entirely abolished.

While I have indicated a preferred form of construction of inductor, my invention covers any other form of inductor embodying the principles outlined above, and I aim, in the appended claims, to cover all changes and modifications within the spirit and scope of my invention.

I claim as my invention:

1. In a high-frequency generator, a rotor of non-magnetic material, having insets of magnetic material, the cross-section of which is greater at the interior than near the surface of said rotor, whereby the non-magnetic material holds said insets in place.

2. In a high-frequency generator, a stator having a body and two circular rows of teeth. the teeth of each row extending from said body towards the teeth of the other row and each tooth being wider at the end farther from the body, thereby providing overhung slots between the teeth, in combination with a rotor of non-magnetic material extending into the space between said rows of teeth, said rotor having pole members of magnetic material each extending radially a distance approximately equal to the radial length of the teeth, extending through the rotor nearly the distance between the rows of teeth, and extending circumferentially a greater distance in the interior of the rotor than adjacent its surfaces.

3. In a high-frequency generator, a stator having a body and two circular rows of teeth, the teeth of each row extending from said body towards the teeth of the other row and each tooth being wider at the end farther from the body, thereby providing overhung slots between the teeth, in combination with a rotor of non-magnetic material extending into the space between said rows of teeth, said rotor having pole members of magnetic material each extending radially a distance approximately equal to the radial length of the teeth, extending through the rotor nearly the distance between the rows of teeth, and extending circumferentially a greater distance in the interior of the rotor than adjacent its surfaces, the edge surfaces of said pole pieces being rounded whereby a desirable wave form is given to the output of the generator.

In testimony whereof, I have hereunto subscribed my name this 22nd day of June, 1923.

CARTHRAE M. LAFFOON.